United States Patent
Nolan, Jr. et al.

[15] 3,680,322
[45] Aug. 1, 1972

[54] PIPELINE LAYING SYSTEM UTILIZING AN INCLINED RAMP

[72] Inventors: Clyde E. Nolan, Jr.; William A. Morgan; William R. Rochelle, all of Houston, Tex.

[73] Assignee: Brown & Root, Inc., Houston, Tex.

[22] Filed: April 15, 1970

[21] Appl. No.: 28,732

[52] U.S. Cl. ................................................61/72.3
[51] Int. Cl. ...........................F16l 1/00, B63b 35/04
[58] Field of Search ........61/72.3, 72.1, 72.4; 214/1 P

[56] References Cited

UNITED STATES PATENTS

| | | | |
|---|---|---|---|
| 3,524,326 | 8/1970 | Craste | 61/72.3 |
| 3,266,256 | 8/1966 | Postlewaite et al. | 61/72.3 |
| 3,472,034 | 10/1969 | Lawrence | 61/72.3 |
| 3,491,541 | 1/1970 | Berard | 61/72.3 |

FOREIGN PATENTS OR APPLICATIONS 1,492,277   1967   France..........................61/72.3

Primary Examiner—Jacob Shapiro
Attorney—Burns, Doane, Benedict, Swecker & Mathis

[57] ABSTRACT

Method and apparatus for laying pipelines wherein an elongated ramp means is mounted on a vessel for selective pivotal movement. The ramp means supports the pipeline so as to produce a desired penetration angle of the pipeline into the body of water and is provided with a fixed clamp means for maintaining the pipeline substantially stationary with respect to the vessel during operations performed in connection with adding new pipeline sections, and with a movable clamp means for tensioning the pipeline during payout of the pipeline. An elongate pipe section loader means is also pivotally mounted on the barge for movement between a substantially horizontal position and controllable pivotal positions aligned with the inclined ramp means. In its horizontal position, the loader means receives a new section of pipe after which the loader means is pivoted upwardly toward the inclined ramp means. Thereafter, the pipe is transferred to the ramp means for continuation of the laying operation while the loader is returned to its horizontal position to receive a new pipe section.

26 Claims, 15 Drawing Figures

PATENTED AUG 1 1972   3,680,322
SHEET 1 OF 5
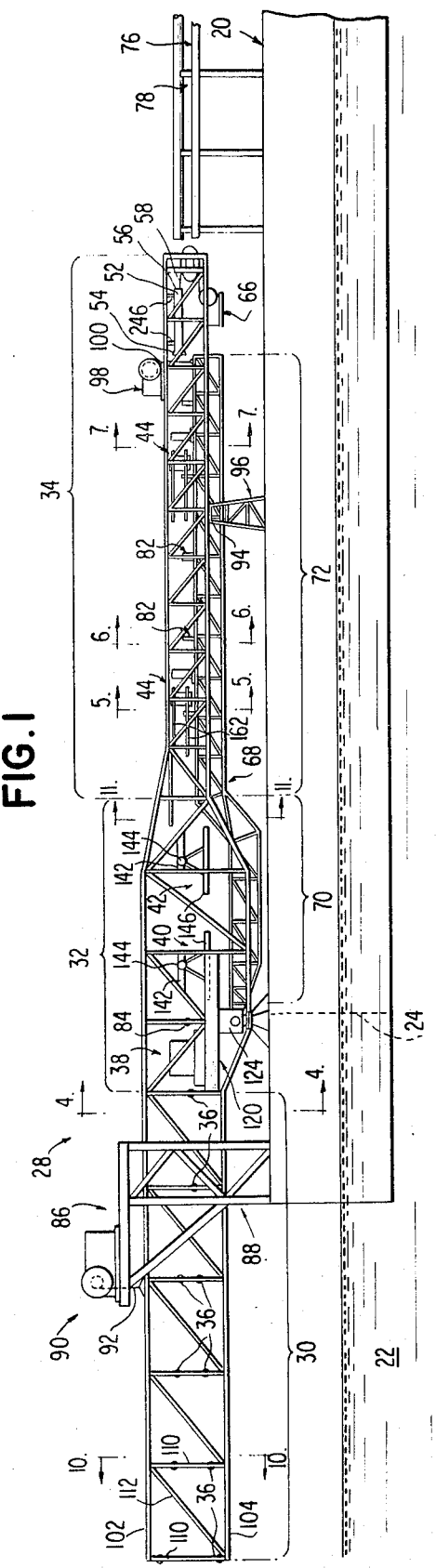
FIG. 1
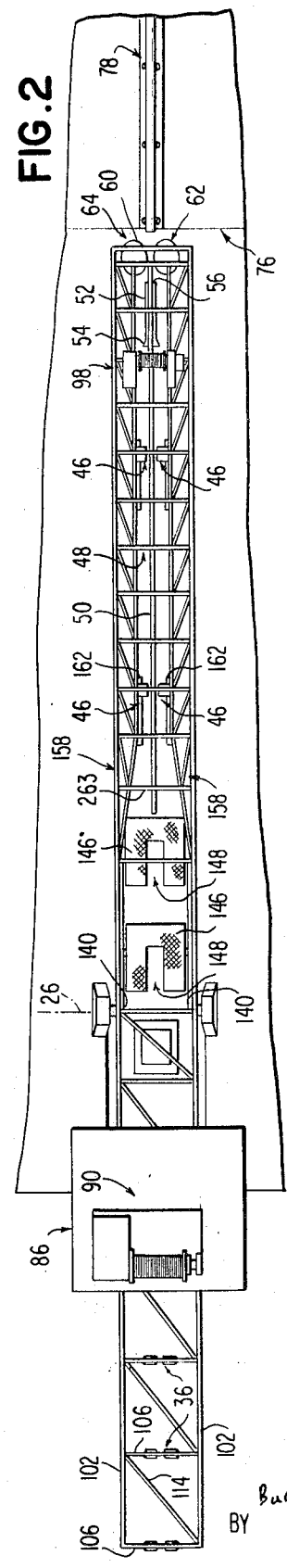
FIG. 2
FIG. 3
INVENTORS
CLYDE E. NOLAN, JR.
WILLIAM A. MORGAN
WILLIAM R. ROCHELLE
BY Burns, Doane, Benedict,
Swecker & Mathis
ATTORNEYS

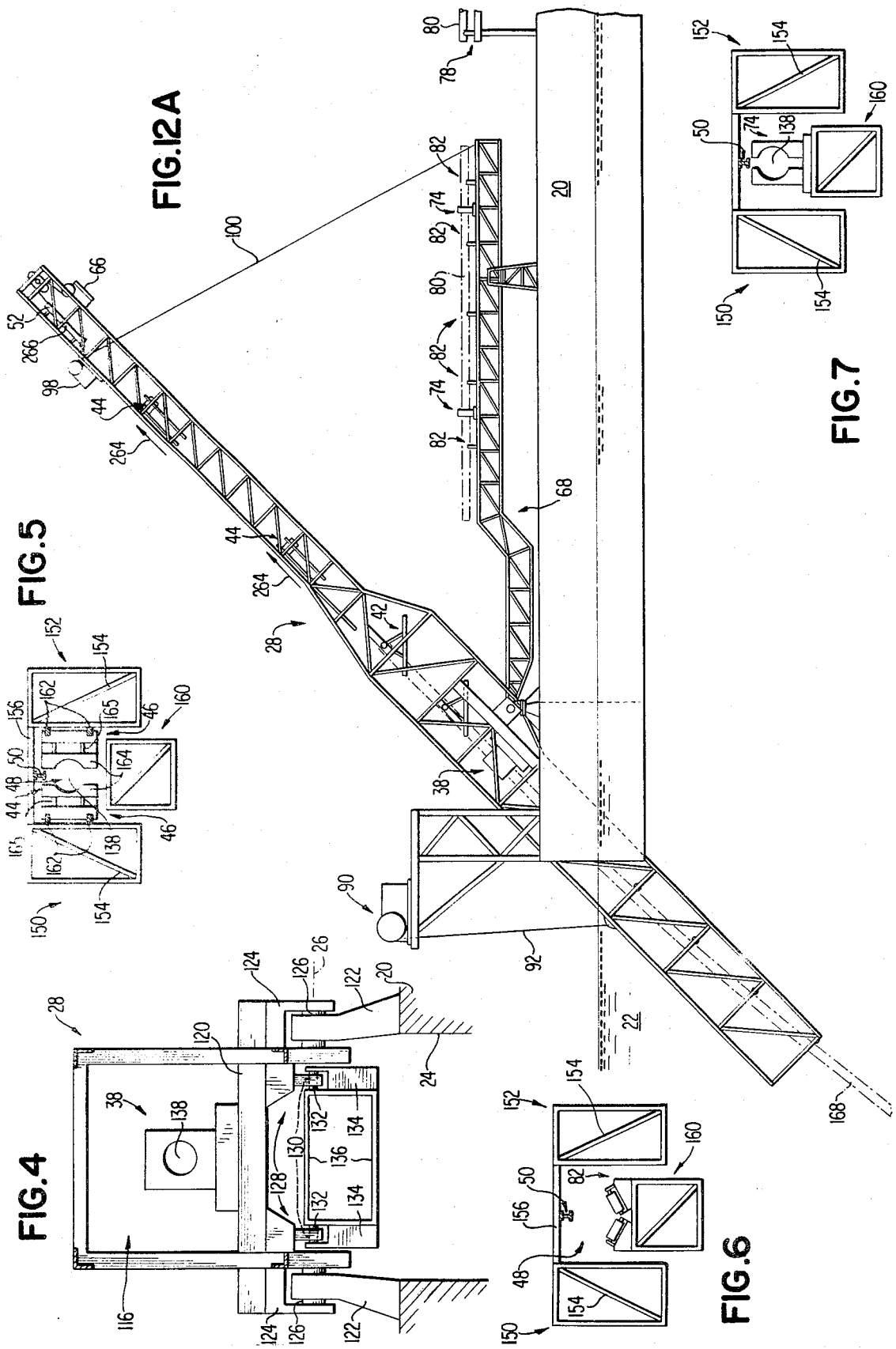

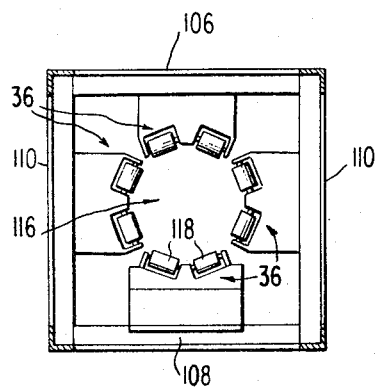
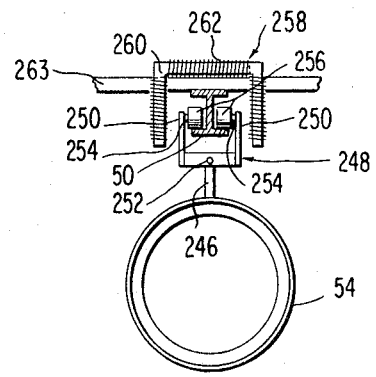
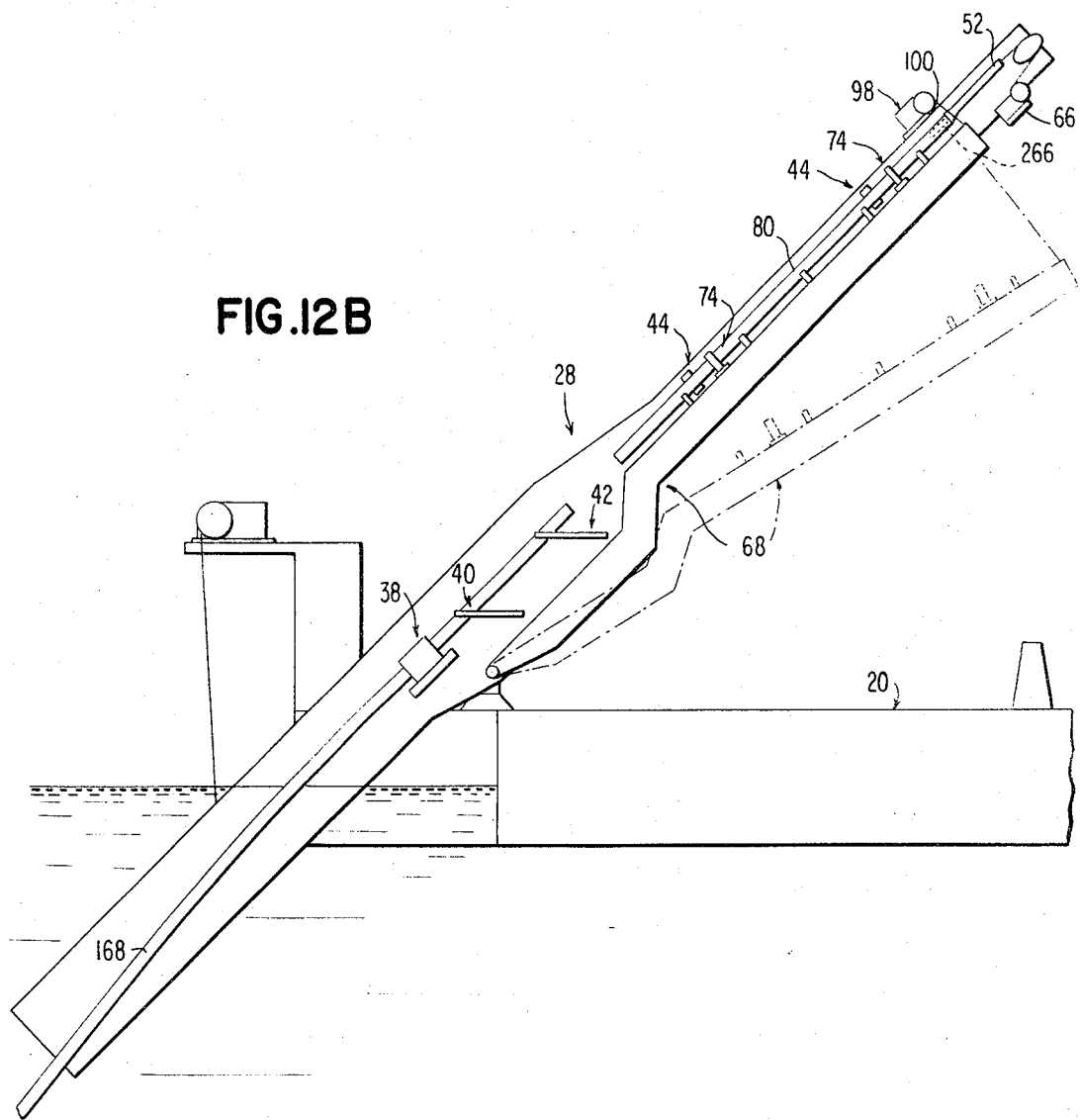

PIPELINE LAYING SYSTEM UTILIZING AN INCLINED RAMP

BACKGROUND OF THE INVENTION

This invention relates to a method and apparatus for laying pipelines from a floating vessel and onto a surface submerged beneath a body of water. In particular, this invention relates to an improved pipeline laying system wherein the angle at which the pipeline penetrates the water is controllable utilizing a pivotable ramp.

In the past, it has been common in pipelaying operations to utilize, for pipeline profile and stress control, a buoyant ramp pivotally attached to a floating lay vessel to support a portion of a pipeline depending into a body of water from the lay vessel. However, as water depth increases, it has been found that the length of the buoyant ramp needed to provide adequate support for the control of the pipeline profile may become appreciably large. With this increased length, the buoyant ramp may exhibit a greater degree of vulnerability to damage from stress caused by the supported pipeline or sea conditions.

In connection with proposed pipeline laying systems, it has been implicitly recognized that utilization of such a buoyant ramp may in some cases be dispensed with, by the control of the pipeline profile and stress conditions through control of the angle, with respect to the horizontal, of the pipe being lowered from the vessel. This desired penetration angle for a given, desired profile may vary depending upon numerous conditions, such as pipeline weight and yield point, speed of vessel movement, and water depth. Moreover, for fixed laying conditions, the desired angle may vary depending upon the selected elevational profile of the pipeline, which may take for form of a catenary, flexed beam, tensioned beam or other desired configurations as pointed out in U.S. Lawrence Pat. No. 3,472,034, assigned to the assignee of the present invention.

Prior pipelaying techniques, such as that disclosed in U.S. Lawrence Pat. No. 3,472,034 and United States Postlewaite et al. U.S. Pat. Nos. 3,266,256 and 3,389,563, envisioned the variation of pipeline penetration angle utilizing a pipeline receiving frame pivotally mounted on a floating vessel. Also, a contemporaneous system disclosed on pages 52–54 of the March, 1970, Volume 5, No. 3 issue of "Ocean Industry," a publication of Gulf Publishing Company, discloses a pivotable ramp utilized in a flexed beam pipeline laying technique.

Although such techniques may be acceptable, they may present certain operational difficulties, particularly in the supply of additional pipe sections to and from the pivotable pipeline receiving frame. Moreover, such techniques are somewhat limited in the ability to vary the penetration angle of a pipeline to a great degree.

Since relatively shallow water laying operations may, due to pipeline characteristics such as size and weight, require a smaller penetration angle in order to maintain the desired pipeline profile, while other laying operations may require large penetration angles of 60° or more, the previously noted systems are limited in applicability.

OBJECTS AND SUMMARY OF THE INVENTION

It is, therefore, a principal object of the present invention to provide a pipeline laying system wherein the penetration angle of the pipeline is controllable utilizing a pivotal ramp means or receiving frame mounted on a floating vessel and wherein operational difficulties connected with the supply of additional pipeline sections are minimized.

A further principal object of the present invention is to provide a pipeline laying system wherein the penetration angle of the pipeline is controllable over a wide range.

It is another object of the invention to provide a pipeline laying system, utilizing a pivotal ramp means or receiving frame, that is compatible with the performance of continuous operations relating to the addition of new pipeline sections.

It is a related object of the invention to provide such a pipeline laying system, utilizing a pivotal ramp means or receiving frame, that is compatible with the performance of continuous operations relating to the addition of new pipeline sections.

A preferred embodiment of the invention intended to accomplish at least some of the foregoing objects includes a lay vessel provided with a slot in the stern thereof. Pivoted on the vessel adjacent this slot is an elongate substantially rigid, pipe receiving ramp. The ramp is pivoted at a position intermediate its ends and is selectively moveable between a substantially horizontal position and pivotal positions at an angle as much as 80° to the horizontal. On the ramp are mounted first and second clamp means. One clamp means is fixed substantially on the ramp and is utilized to maintain the pipeline substantially stationary with respect to the vessel during operations associated with adding new sections of pipeline. The other clamp means is movably mounted on the ramp and is operable to impart tension to the pipeline during a pipeline payout operation.

Pivoted, preferably about the same axis as the pivot axis of the ramp, is a pipe section loader means. The loader means is provided with means for securing a pipe section thereto, which pipe section is placed on the loader means when it is in a generally horizontal position. In the preferred embodiment, the loader means is pivotally mounted in such a manner as to be moveable to positions wherein the support for the pipe section on the loader means and the pipe support elements associated with the ramp means are substantially coplanar and longitudinally aligned. Upon pivoting of the loader means to this position, the new section of pipe is aligned with and welded to the existing pipeline at a work station.

A work station platform provided for this purpose is pivotally mounted on the ramp in free swinging fashion so as to remain substantially horizontal in any position of the ramp.

After transfer of the pipe section to the ramp means, the loader means may be returned to its horizontal position for receiving a new section of pipe while the incremental payout operation of the pipeline which places the welded joint at a subsequent work station is conducted. Subsequently, the pipeline is paid out by a further amount, with the total amount of pipeline payout being substantially equal to the length of the newly added pipeline section. At this point the loader is pivoted upward to provide a further new pipeline section for welding.

In this manner, a continuous laying operation may be accomplished in a fashion uninhibited by the provision of new pipeline sections with the aid of the loader means. Moreover, the described preferred embodiment of the invention enables the control of pipeline penetration angles in a wide range.

THE DRAWINGS

Other objects and advantages of the present invention will become apparent with reference to the subsequent detailed description of a preferred embodiment thereof with reference to the accompanying drawings in which:

FIG. 1 is a transverse, elevational view illustrating a pipelaying barge provided with a ramp means and a pipe section loader means according to the present invention;

FIG. 2 is a top plan view of the structure shown in FIG. 1, with the loader means omitted for clarity;

FIG. 3 is a top plan view of the structure shown in FIG. 1, with the ramp means and is associated structure omitted for clarity;

FIG. 4 is cross-sectional elevational view taken along line 4—4 of FIG. 1 and illustrating the pivotal connection of the ramp means and loader means to the vessel;

FIG. 5 is a cross-sectional view taken along line 5—5 of FIG. 1 and illustrating the pipeline positioning clamps on the ramp means;

FIG. 6 is a cross-sectional view taken along line 6—6 of FIG. 1 and illustrating the pipe section support means on the loader means;

FIG. 7 is a cross-sectional view taken along 7—7 of FIG. 1 and illustrating the location of one clamp means on the loader means;

Figure 9:
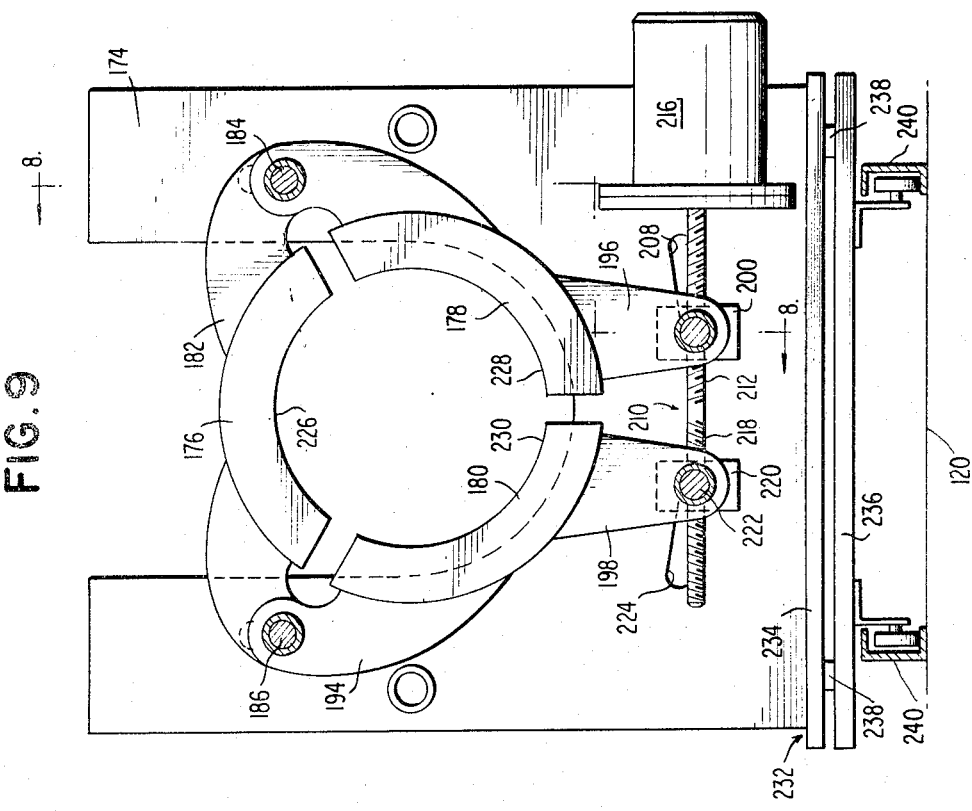
Figure 8:
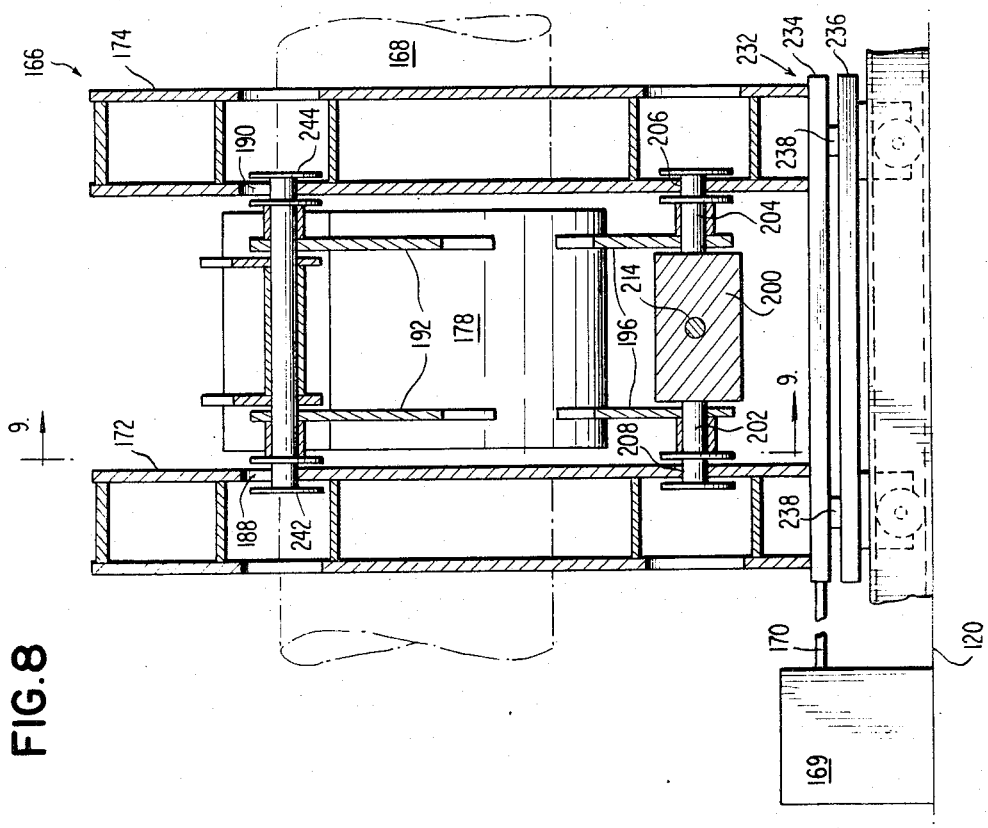

FIG. 8 provides a partially sectioned, side elevational view taken along the 8—8 of FIG. 9, of the stationary clamp means provided on the ramp means;

FIG. 9 provides a partially sectioned, end elevational view of the clamping mechanism shown in FIG. 8 as viewed along line 9—9 thereof;

FIG. 10 is a cross-sectional view taken along line 10—10 of FIG. 1 and illustrating a portion of the pipeline guiding section of the ramp means;

FIG. 11 is a somewhat enlarged, partial cross-sectional view along line 11—11 of FIG. 1, with a guide tube of the apparatus displaced and illustrating a holding device for maintaining the guide tube of the internal clamp means stationary on the ramp means; and FIGS. 12a, 12b, 12c and 12d are schematic transverse elevational views illustrating a pipelaying procedure according to the present invention.

DETAILED DESCRIPTION

Basic Components

With reference to FIGS. 1-3, one form of the basic structure utilized in the pipelaying system of the present invention may be seen.

In FIG. 1, a pipelaying barge 20 is shown floating on a body of water 22. The barge 20 is provided at the stern thereof with a slot 24 communicating with the water body 22.

Mounted adjacent the slot 24 for rotation about a generally horizontal axis 26 (FIG. 2) is an elongate, substantially rigid ramp means 28. This ramp means is selectively movable between a generally horizontal position and pivoted positions forming an angle of as much as eighty degrees with respect to the horizontal.

The ramp means 28 may be considered a tower-like structure formed in three sections: a pipeline guiding section 30, extending outwardly of the stern of the barge 20; an intermediate work area and clamping section 32; and a pipeline receiving and payout section 34 extending toward the bow of the barge 20.

At the pipeline guiding section 30, a plurality of pipeline guiding members, schematically shown at 36 in FIGS. 1 and 2 (and omitted from all other Figures except FIG. 10 for simplicity) are provided. These guiding members 36, hereinafter more fully described, prevent a pipeline leaving the ramp means from attaining less then a predetermined radius of bend throughout the length of the pipeline guiding section 30. Generally the angle at which the pipe may leave the guiding section 30 will be between five degrees and seven degrees of its intended direction without excessively stressing the pipeline.

The work area and clamping section 32 of the ramp means 28, is provided, adjacent the guiding section 30 with a clamp means 38 substantially fixed with respect to the ramp means 28. This clamp means 38, hereinafter more fully described, is selectively operative to maintain a pipeline substantially stationary with respect to the ramp means 28, and therefore with respect to the barge 20. Also mounted in the intermediate ramp means section 32 are at least two work station platforms 40 and 42.

The work station platform 42 nearest the bow of the barge 20 functions as a support for workmen operating to secure new sections of pipe to the end of the previously laid portion of pipeline. For convenience this station 42 is hereinafter referred to as a welding station, although other securing methods may be performed there. The other work platform 40 serves to support workmen associated with a pipe joint inspection or pipe joint coating operation. As subsequently described, the platforms 40 and 42 are adjustable to remain level in all rotatable positions of the ramp means 28.

The pipeline receiving and payout section 34 of the ramp means 28 is provided, with longitudinally spaced pipe section manipulating clamps 44. These clamps 44, as shown in FIG. 2, are comprised of oppositely facing, mirror images related, clamp sections 46 spaced on opposite sides of a pipe section receiving space 48. As subsequently described, the clamps 44 may be operable to manipulate a pipe section to axially align it with the end of the previously laid pipeline supported in the guiding section 30 and in the intermediate section 32 of the ramp means 28. They are also operative to position the end of the pipe section in the desired spaced relation to the pipeline for the purpose of establishing the desired welding root gap.

In FIG. 2, it may be seen that the receiving and payout section 34 of the ramp means 28 supports a longitudinally extending monorail 50 above the pipe section receiving space 48. As hereinafter more fully described, this monorail 50 supports, for longitudinal travel of the ramp means 28, a clamp housing 52. The clamp housing 52 is a generally cylindrical hollow member having a bell shaped, stern facing open end 54 and a substantially closed, bow facing end 56.

The substantially closed end 56 is sufficiently open to receive a tension cable 58 and an hydraulic umbilical 60, respectively passing around sheaves 62 and 64 suitably mounted on opposite sides of the bow end of the ramp means 28. The cable 58 and umbilical 60 are controlled by remotely operable winch controls 66 (only one of which is shown) supported on the ramp means 28.

Internally of the clamp housing 52 the cable 58 and umbilical 60 are connected to an internal clamp schematically shown in FIG. 12 at 266, of the type described and claimed in the copending application of Clyde E. Nolan, Jr., filed on even date herewith for "Internal Tensioning System for Laying Pipeline," and assigned to the assignee of the present invention. The disclosure of that application is hereby incorporated by reference. A functional description of the internal clamp, the sole invention of Clyde E. Nolan and not the joint invention of the present applicants, hereinafter appears. At present it is sufficient to note that the internal clamp serves to internally engage at least one of the pipeline or the new pipe section added thereto, and is tensioned by means of the conventional winch control 66 and the tension cable 58 to impart tension to the pipeline as the barge 20 is advanced during a pipeline payout operation.

It may be here noted that pipeline payout may alternatively be accomplished, without relaying on vessel movement, in the manner set forth in the section entitled "COMPOSITE MODE OF OPERATION OF WHEEL-TYPE TENSION MECHANISM 18 AND CLAMPING MECHANISM 19 FOR PIPE FEEDING OPERATION," of the U. S. Pat. Application of Jerry J. Jones et al., Ser. No. 814,558, filed Apr. 9, 1969, for "Method and Apparatus for Laying Pipelines," and assigned to the assignee of the present invention. The pertinent disclosure of this patent application is hereby incorporated by reference.

Pivotally mounted on the barge 20, preferably for movement about the same axis 26 as the pivot axis of the ramp means 28, is an elongate substantially rigid, pipe section loader means 68. The loader means in the illustrated embodiment is a tower-like structure, that is generally reverse Z-shaped in starboard elevation (see FIG. 1).

The lower section 70 of the loader means 68 may be received in non-interfering relation directly beneath the work area clamping section 32 of the ramp means 28. The upper section 72 of the loader means 68 may be non-interferingly received beneath the pipeline receiving and payout section 34 of the ramp means 28.

This upper section 72 of the loader means 68 is provided with longitudinally spaced clamp means 74 (FIG. 3), hereinafter more fully described, on the upper portion thereof. These clamp means 74 serve to maintain a section of pipe stationary with respect to the loader means 68 during transport of the pipe section by the loader means 68 to the ramp means 28.

Such sections of pipe are normally stored at a pipe rack station 76 supported on the barge 20 in a position fore of the ramp means 28 and loader means 68. Generally centrally of the pipe rack station 76, a pipe section conveyor means 78 may be located.

When the loader means 68 is in a lower position thereof (i.e. generally horizontal in the illustrated embodiment), the conveyor means may be operated to deliver a pipe section 80 thereto. In this lower position, a generally straight loader support means, defined by longitudinally spaced support stations 82, is longitudinally aligned with the support means provided by the conveyor means 78.

Upon receipt of a pipe section 80, the loader means 68 may be moved to an upper position wherein the loader support means defined by the support stations 82 is generally coplaner with the pipeline support means of the ramp means 28. This pipeline support means of the ramp means may be considered to be means for supporting a generally straight portion of pipeline, and may be considered as defined by the pipeline guiding member 36 nearest the ramp means intermediate section 32, the fixed clamp means 38 on the ramp means intermediate section, and one or more additional support members (that may be substantially identical to the guiding members 36) which, if desired, may be suitably mounted in the intermediate section 32 of the ramp means 28, as schematically indicated at 84 (FIG. 1 only).

As used herein, it is to be noted that the term generally straight, in connection with pipeline portions or support means therefor, contemplates normal pipeline variations and curvature encountered in a pipelaying operation.

In the illustrated embodiment, by reason of the mounting relationship between the ramp means 28 and loader means 68, the ramp support means and the loader support means are longitudinally aligned as well as being coplaner. Unimpeded transfer of a pipe section 80 to the manipulating clamps 44 of the ramp means 28 is, therefore, significantly facilitated.

At this point it may be noted that such relationship, while significantly advantageous, is not absolutely necessary in order to obtain many benefits of the present invention. It is, however, desirable to provide some form of loader means, having a generally straight pipe section support means, that may be moved into coplanar relationship with pipeline support means on the ramp means, preferably by movement only through space remote from the end of the pipeline supported by the ramp means. In this manner, operatively simple transfer of the pipe section to the ramp means is facilitated by reason of the fact that manipulation of the pipe section to align it with the previously laid pipeline is limited to substantially minor adjustments. Moreover, transfer of the pipe section does not present a danger to workmen since the pipe section is transported remote from the pipeline end, and therefore, remote from the work area. Nor does transfer interrupt the continuity of the pipelaying operation since the loader means may, without interference, return for new sections of pipe during connecting of the new section and payout of the pipeline.

In this connection it will be appreciated that the invention in its broad aspects encompasses truly continuous laying operations wherein the pipeline is continuously paid out while new sections of pipe are added, as well as those operations wherein the pipeline is intermittently held against substantial relative movement with respect to the floating vessel.

An example of a modified form of an arrangement partaking of the above advantages may take the form of a loader means mounted for movement at the side of, rather than beneath the ramp means. In such a situation the loader means may be readily provided with a movable transfer mechanism, such as pivotable clamps, for laterally transferring the pipe section to the ramp means after the loader pipe section support means is positioned substantially coplanar with ramp pipeline support means.

With reference once again to FIGS. 1-3, it may be seen that in the illustrated embodiment, the guide section 30 of the ramp means 28 is straddled by a platform 86 supported by mounting frames 88 on opposite sides of the barge slot 24. Only a portion of the frames 88 are shown in FIG. 3.

On the platform 86 a winch 90 may be provided. This winch controls the inclination of the ramp means 28 through positioning of a cable 92 passing through a platform aperture (not shown) and connected, in any suitable manner, to the guide section 30 of the ramp means 28. The guide section 30 may be counterweighted so as to tend to rotate the ramp means 28 (in a counterclockwise direction as viewed in FIG. 1) about the pivot axis 26.

In the uppermost position of the cable 92, the ramp means 28 is maintained in a substantially horizontal position with the pipeline receiving and payout section 34 resting on the upper portion 94 of a support tower 96 fixedly mounted on one side of the barge 20. Selective payout of the cable 92, by reason of the counterweighted guide section 30, is capable of maintaining the ramp means 28 is selected, stationary pivoted positions. The slot 24 in the barge stern receives the guide section 30 of the ramp means as the angle of the ramp means, with respect to the horizontal, increases.

Control of the position of the loader means 68 is facilitated by means of a winch 98 suitably supported on the upper portion of the payout and receiving section 34 of ramp means 28. This winch 98 controls a cable 100 passing through the pipe section receiving space 48 and connected, in any suitable manner, to the loader means 68. This connection, of course, is such that interference with a pipe section 80, placed on the loader means 68 by the conveyer means 78, is avoided.

In its lower position, the loader means 68 may, if desired, rest upon lateral extension of the tower 96. When the ramp means 28 in initially pivoted upwardly, the loader means control winch 98 is operated to permit the loader means to remain in its lower position. After supply of a pipe section 80 to the loader means 68, the winch 98 is operated to retrieve its cable 100 so as to pivot the loader means 68 upwardly to its preselected stationary pivoted position. If desired, a suitable stop means (not shown) may be provided on the ramp means 28 to insure against overtravel of the loader means, or the winch 98 may be arranged so that the loader means is automatically correctly positioned in the fully retracted position of the cable 100.

Structural Details

Referring now particularly to FIGS. 4-11, the illustrated structural features of the ramp means 28 and loader means 68 will be discussed as an example of an acceptable form of the basic elements which may be utilized in the pipelaying system of the present invention.

The guiding section 30 of the ramp means 28 may be considered to be formed of interconnected, generally cubical truss sections. Description of the components will be with reference to the ramp means 28 in a horizontal position. Each cubical truss section may include: longitudinally extending parallel pairs of spaced, upper and lower horizontal beams 102 and 104; transversely extending parallel pairs of spaced upper and lower horizontal beams 106 and 108; diagonally extending, parallel pairs of spaced struts 112 interconnecting parallel upper and lower beams 102 and 104 and parallel vertical struts 110; and diagonally extending horizontal girders 114 interconnecting the longitudinally extending and transversely extending beams (FIGS. 1, 2 and 10). In this manner a rugged, rigid truss network is formed, defining a central ramp opening, 116 (FIG. 10) for receiving pipeline, unobstructed by the tower elements of the ramp means 28.

As shown in FIG. 10, the previously identified guiding elements 36 of the guiding section 30 may be supported on the lower, transversely extending horizontal beams 108. Additional guiding elements 36 may be disposed on the upper beams 106 and vertical struts 110. These guiding elements 36 may consist of conventional support rollers 118 having mutually inclined axes of rotation. The rollers may, if desired, be vertically adjustable. In FIG. 1, it may be seen that the elements 36 more remote from the bow of the barge 20 are successively positioned in radially more outer positions to define a predetermined radius of bend of the pipeline supported thereby.

The group of elements 36 in the guiding section 30 may be conveniently referred to as defining a "guide shoe." If desired, steel rings or other means of support may be provided in the guiding section 30 as a "guide shoe." By the annular formation of the guide shoe, whether by rollers or rings, the pipeline is advantageously guided in all directions. Although the pipeline may be normally maintained out of engagement with the guide shoe, the guide does control the bend of the pipeline and permit the pipeline leaving the ramp means 28 to attain a predetermined bend.

The intermediate section 32 of the ramp means 28 is also comprised of truss sections defined in a manner similar to those of the pipeline guiding section 30. These sections will not be discussed in detail, since the structural differences will be apparent to one skilled in the art.

From FIGS. 1 and 4, it will be seen that a clamp support platform 120 is located within the truss sections immediately above and on opposite sides of the pivot axis 26. This platform spans the pivot axes and extends laterally beyond the truss network axis mounting means 122 located on opposite sides of the barge slot 24 and fixedly attached to the barge 20.

The platform 120 is rigidly connected, in any suitable manner to the truss elements. Projecting downwardly from the platform 120 on opposite sides thereof and fixed thereto are pivot mounting flanges 124. These flanges are rotatably journaled on pivot bolts 126, projecting through and supported by the mounting means 122. The pivot bolts 126 define the axis of rotation 26 of the ramp means 28.

Intermediate the outer sides of the platform 120 are downwardly projecting mounting flanges 128 defining apertures 130 axially aligned with the pivot axis 26.

These apertures receive pivot bolts 132 on which spaced brackets 134 are rotatably mounted. These brackets 134 are suitably connected to the end frame members 136 forming the end members of the loader means 68. Thus, the loader means 68 is also pivotally mounted for rotation about the axis 26.

Although a particular pivot connection has been described for rotation of the ramp means 28 and the loader means 68 about the axis 26, it will be apparent that many other structural arrangements would be acceptable.

Again, by referring to FIG. 4, it may be noted that the central ramp opening 116 also exists in the intermediate section 32 of the ramp means above the platform 120. The previously identified fixed clamp means 38 is supported on the platform 120 so that the axis 138 defined by the clamping sections thereof, hereinafter more fully described, is coincident with the axis of the pipeline passing through the central ramp opening 116.

The platform 120 may also be utilized to support one or more of the previously identified support means 84, which may be identical to the roller supports 36 of the guiding section 30. In addition, since the bottom, horizontal, transversely extending truss members 108 (previously described in connection with the guiding section 30) are eliminated from the intermediate ramp means section 32 in order to prevent interference between the ramp means 28 and the loader means 68, the platform 120 may also be utilized to mount the initial support means 36 of the "guide shoe." For convenience, this mounting has not been shown in FIG. 4.

It should be here noted that although the platform 120 spans the truss sections of the intermediate guiding section 32 in the area of the support provided for the clamp means 38, the platform is bifurcated as indicated at 140 (FIG. 2) to permit self-leveling movement of the previously identified work station 40.

In FIGS. 1 and 2, it may be seen that such provision for self-leveling of the work stations 40 and 42 may be accomplished by securing horizontal mounting brackets 142 to the truss members on the port and starboard sides of the intermediate ramp section 32. These support brackets 142 each mount pivot pins 144 from which platforms 146 are supported in free-swinging fashion. The generally horizontal axis defined by the pivot pins 144, and the free-swinging of the platforms 146 insures that the work station platforms remain horizontal in all pivotal positions of the ramp means 28. If desired, once the work station platforms 146 are horizontally oriented with the ramp means 28 in a pivotal position, means (not shown) may be employed to restrain the platforms 146 in that horizontal orientation. As indicated in FIG. 2 at 148, the platforms 146 are bifurcated in order to prevent interference with a pipeline passing through the central passageway 116 of the ramp means (see FIG. 12).

With particular reference to FIGS. 5, 6 and 7, the illustrated structural composition of the pipeline receiving and payout section 34 of the ramp means 28, as well as the major portion of the loader means 68 may be described. As shown in these Figures, the pipeline receiving and payout portion 34 of the ramp means 28 includes port and starboard interconnected truss sections 150 and 152 spaced on opposite sides of the previously identified pipe section receiving space 48.

It will be appreciated that the truss sections 150 and 152 are substantially identical in structure, but smaller than, the truss sections forming the guide section 30 of the ram means 28, with the additional existence of vertical, inclined struts 154 extending diagonally between the upper and lower truss members. In addition, it will be recognized that the truss sections 150 and 152 are mirror image related, and connected by transversely extending, horizontal girders 156 which span the pipe section receiving space 48. These braces 156 support the previously identified monorail 50 on which the housing 52 for the internal clamp is slidably mounted.

From FIG. 2 it may be seen that suitable transitional truss sections are provided, as indicated at 158, for interconnecting the truss sections 150 and 152 of the pipe receiving and payout section 34 with the truss sections of the intermediate ramp means section 32.

FIGS. 3 and 5-7, illustrate that the upper section 72 of the loader means 68 is formed of interconnected truss sections 160 substantially identical to the truss sections 150 and 152 of the pipeline receiving and payout section 34 of the ramp means 28. The lower section 70 of the loader means 68 is similarly arranged, and is interconnected to the upper section 72 in any suitable manner.

From FIG. 6, it may be seen that the upper truss members of the loader means truss sections 160 support the previously identified support stations 82 which together define a generally straight, loader support means. These support stations 82 may be substantially identical to the roller guiding units 36 discussed in connection with FIG. 10. It is noted that suitable provision may also be made for the vertical adjustment of the support stations 82.

FIG. 5 provides an end elevational view of the clamp sections 46 of the pipe section manipulating clamp 44 supported on the pipe receiving and payout section 34 of the ramp means 28. These clamp sections 46 are disposed in mirror image relationship on opposite sides of the pipe section receiving space 48. Each clamp section 46 may be mounted on upper and lower horizontal support girders 162 secured in any suitable manner to the oppositely facing portions of the truss sections 150 and 152. The mounting of the clamp sections 46 on the support girders 162 is such as to permit longitudinal movement of the clamp sections 46 along the length of the girders 162. The purpose of this mounting is to permit manipulation of a pipe section gripped by the clamping members 44 toward and away from the welding work station 42.

The clamping sections 46 are each provided with concave gripping elements 164 which may be of the resilient type. In FIG. 5, these gripping members 164 are shown in their extended positions for gripping a pipe section (not shown). It will be appreciated that the axis 138 defined by the concave gripping members 164 is coincident with the axis of the gripped pipe section. Suitable means, such as hydraulic pistons schematically illustrated at 165 may be provided for moving the gripping elements 164 toward and away from the pipe section. If desired, provision may be made for vertical movement of the clamp support girders 162 to accomodate for slight changes in the orientation of the axis of the supported pipe section.

In FIG. 7 an end elevational, schematic view of one of the previously identified fixed clamps 74 mounted on the loader means 68 may be seen. As illustrated, these clamps 74 are supported on the upper members of the loader means truss sections 160. In the illustrated position, the fixed clamps 74 define an axis 138 coincident with the axis defined by the gripping members 164 of the manipulating clamps 44. It may be noted that the fixed clamps 74 on the loader means 68 are substantially identical, except for mounting, to the manipulating clamps 44 on the ramp means 28. The mounting provides for vertical and lateral adjustment of the sections in any suitable manner.

As shown in FIG. 8, the clamping mechanism 38 comprises a gripping assembly 166 which may be mounted for limited, indeed often visually undetectable, movement in a stress indicating direction, extending longitudinally of the pipeline 168 supported on the ramp means 28. The gripping assembly 166 is connected to a load cell unit 169 by means of force transmitting connecting link 170. The load cell 169 is fixedly secured to the support platform 120 aft of the assembly 166. This load cell may comprise, for example, an hydraulic type, load transducer of the type manufactured by Martin-Decker Corp., of Long Beach, Calif., under designation CC–1000–50. Obviously, however, a variety of other pneumatic, hydraulic, electrical or mechanical load cells may be employed.

The clamping mechanism 166 may comprise an articulated clamping mechanism of the type generally described in bulletin 66-2 of the Gray Tool Co., Post Office Box 2291, Houston, Tex.

In the arrangement shown in FIG. 8, the load cell unit 169 would include a housing fixedly connected with the platform 120. This housing would support a load cell, possibly of the type above-described, disposed in generally longitudinal force-sensing alignment with the force transmitting member 170. This load cell may be interposed between the force transmitting member 170 and the load cell housing in a conventional manner.

With this arrangement, force is transmitted generally longitudinally from the assembly 166 to the load cell unit 169 with the member 170 functioning as a compression type, force transmitting member. It will also be apparent that the load cell unit 169 may be located forward of the assembly 166 with the load cell being arranged to permit the member 170 to function as a force transmitting member acting in tension.

As shown in FIGS. 8 and 9, the clamping assembly 166 includes laterally bifurcated, stern and bow facing, framing units 172 and 174. Three, arcuate pipe clamps 176, 178 and 180 are supported by, and disposed longitudinally intermediate of, the framing units 172 and 174.

The uppermost segment 176 is connected by bracket means 182 to detachably mounted pins 184 and 186. These pins 184 and 186 are mounted on opposite sides of each of the bifurcated framing units 172 and 174.

Each of the mounting pins 184 and 186 is disposed in a vertically elongated slot for limited, vertical movement. Thus, the mounting pin 184 is disposed in slot means 188 and 190 on the starboard side of the framing units 172 and 174 respectively. The pin 186 is disposed in mirror image related slot means on the port side of the framing units 172 and 174.

Brackets 192 and 194 serve to pivotally mount the upper end of the clamp segments 178 and 180, respectively, on the mounting pins 184 and 186 as indicated generally in FIGS. 8 and 9.

As shown generally in FIG. 9, bifurcated brackets 196 and 198 depend downwardly from the lower, free extremities of the clamp segments 178 and 180, respectively.

A screw block 200 is journaled on the bracket means 196 for pivotal movement about a horizontal axis extending generally parallel to the vertical median plane of a pipeline 168, by way of shaft means 202 and 204. The shaft means 202 extends in an aft direction, to pass through a cam slot 206 in the framing unit 172. The shaft 204 extends, in a forward direction, to intersect the cam slot 208 carried by the framing unit 174. The cam slots 206 and 208 are parallel.

A threaded adjusting rod 210 includes a portion 212 which passes threadedly through a threaded aperture 214 of the screw block 200. The adjusting rod 210 extends from an electric or hydraulic motor unit 216 mounted on the framing unit 174.

As shown in FIG. 9, the threaded rod 210 also carries a portion 218 which threadedly intersects a screw block 220 carried by the bracket means 198. The screw block 220 includes a shaft means 222 intersecting the cam slot means 224. The screw block 220, like the block 200, is mounted for pivotal movement about a horizontal axis extending generally parallel to the vertical median plane of the pipeline portion 168.

The screw block 220, slot means 224, and shaft means 222, correspond in identical, but mirror image related, fashion to components described in connection with the block 200. However, portions 212 and 218 of the shaft 210 are oppositely threaded and disposed in threaded engagement with the screw blocks 200 and 220, respectively. With this arrangement, rotation of the shaft 210, induced by operation of the motor 216 drivingly connected with that shaft, will induce either convergence or separation of the blocks 200 and 220, depending on the direction of shaft rotation.

Where the shaft 210 is rotated to induce separation of the block, the configuration of the cam tracks is such as to cause separation inducing rotation of the segments 178 and 180, as well as elevating movement of the pivot pins 184 and 186. This elevating movement is permitted by the vertically elongate character of mirror image related slots receiving the pins 184 and 186.

Thus, by separating the blocks 200 and 220, each of the segments 176, 178 and 180 will be caused to move generally outwardly of, and become disengaged from, the outer periphery of the pipeline portion in response to this separation. As a result, during the unclamped condition of the assembly 166, there will be no frictional interaction or dragging between the pipeline and any of the clamp segments.

As will be appreciated, of course, convergence of the blocks 200 and 220 will serve to simultaneously direct the segments 176, 178 and 180 into clamped engagement with the exterior of the pipeline portion.

The segments 176, 178 and 180 may be provided, respectively, with generally cylindrical faces 226, 228 and 230. These faces are generally segmentally cylindrical in character and coaxially oriented with respect to the outer periphery of the pipeline portion when clamped thereto.

The pipeline engaging faces 226, 228 and 230 may be detachably mounted on the clamp segments 176, 178 and 180 respectively. Further, each of the pipeline engaging faces may be fabricated so as to be somewhat resilient in character. It will also be appreciated that various sizes of the engaging faces 226, 228 and 230 may be selected to accommodate for pipelines of different diameters.

The framing units 172 and 174 may be mounted on a base unit 232. The base unit 232 may be provided with an appropriate and conventional elevating means. Thus, as shown in FIGS. 8 and 9, the base 232 may comprise superposed segments 234 and 236, interconnected by a plurality of generally vertically extensible and contractable jacks 238. These jacks may be operated mechanically, electrically or by means of fluid. By operating the various jacks in unison, elevation of the uppermost base portion 234 may be selectively adjusted so as to appropriately locate the elevation of the clamping segments 176, 178 and 180.

Such elevating means will serve to adjust the elevation of the framing units 172 and 174 so as to insure coaxial engagement between the clamping segments and a pipeline, as pipelines of different diameters are handled. As will be appreciated, pipelines of different diameters may require different elevational positions of the framing unit, and different radii for the pipeline engaging faces 226, 228 and 230, in order to insure coaxial engagement between these faces and the pipeline periphery when the pipeline portion is gripped by the clamping mechanism 166.

It is for this reason that vertical movement of the clamps 74 and the previously identified girders 162 (which support the clamps 44 on the ramp section 34) may be also provided.

To insure substantially unimpeded transistion of force between the ramp means 28 and the assembly 166, so that the load cell 167, when employed, will correctly indicate tension imparted by the assembly 166 to the pipeline, the base 236 of the assembly may be mounted upon one or more rail means 240. These rail means extend generally longitudinally of the pipeline 168. As illustrated in FIG. 9, such rail means 240 may be mounted on the barge platform 120 in the intermediate ramp section 32.

In certain instances, it may be desirable to pass a portion of the pipeline having a T-fitting or other protuberance, through the assembly 166. The passing of such protuberance through the assembly may be accomplished, for example, by removing the pin 184 to a position clear of the zone between the bifurcated, port and starboard extremities of the framing units 172 and 174.

Thus, as shown in FIG. 8, the pin 184 may be detachably secured to guide collars 242 and 244, which guide collars are mounted in the vertical slots 188 and 190, respectively. By telescopingly separating the pin 184 from the collars 242 and 244, the segment 176 is free to pivot in a counterclockwise direction, as viewed in FIG. 9. Similar structure may be provided in connection with the pin 186.

Removal of the pin 184 may be facilitated by fabricating this pin from axially separable, but threadedly interconnected components.

It will be recognized, of course, that the function of the mechanism 166 may be performed with a wide variety of clamping and load sensing devices, including tensioner arrangements of the type described in the U.S. Lawrence Pat. No. 3,390,532 assigned to the assignee of the present invention. In this connection, it will be recognized that the assembly 166 may be viewed as comprising a platform from which the upper portion of the pipeline 168 is gripped, with this platform being movable, possibly to a virtually undiscernable degree, to the extent necessary to reflect changes in force acting on the pipeline at this gripping mechanism.

It is also to be understood that when reference is herein made to fixing or securing the pipeline against substantial relative movement with respect to the floating vessel, this term contemplates, but is not limited to, accommodation for pipeline movement caused by wave action as discussed in the aforesaid Lawrence U.S. Pat. No. 3,390,532.

Included in the wide variety of clamping arrangements that may be employed, for example, are vertically reciprocal clamps in lieu of the pivotal clamping members illustrated in FIGS. 8 and 9. It will also be recognized that fluid actuated, packer type gripping members may be employed, such as, for example, those contemplated in the disclosure of United States Delaruelle et al. U.S. Pat. No. 3,273,347. Provision may also be made for utilization of a fixed external clamp assembly of the type disclosed in U.S. Berard Pat. No. 3,491,541. The arrangement of a movable external clamp similar to the one of this patent may also be utilized in lieu of the internal clamp 266 (FIG. 12).

With reference to FIG. 11, a partial cross-sectional view of a means for controlling the position of the internal clamp housing 52 may be seen. As previously mentioned, the housing 52 is permitted to travel longitudinally of the pipeline receiving and payout section 34 of the ramp means 28. This travel is facilitated through the use of the monorail 50. The housing 52 is supported by support arms 246 suitably, fixedly attached thereto.

Each of the support arms depends from a roller assembly 248 slidably mounted on the monorail 50. The support 248 may consist of generally L-shaped bracket members 250. These bracket members 250 are generally mirror-image disposed and interconnected beneath the monorail in any suitable manner as generally shown at 252. Projecting oppositely inwardly from the brackets 250 and rotatably mounted thereon are pins 254 on which wheels 256 are rotatably mounted. These wheels 256 travel in the channels defined by the generally I-shaped configuration of the monorail 50.

Since, as previously mentioned, the rear portion 56 of the internal clamp housing 52 is substantially closed, the clamp housing 52 may be maintained in the relative position of the ramp means 28 as shown in FIGS. 1 and 2, regardless of the inclination of the ramp means 28, merely by operating the winch means 66 so as to retract the internal clamp attached thereto. This action is operative to also retract the housing 52 through interaction between the internal clamp against the substantially closed rear portion 56 of that housing.

As hereinafter more fully described, during a pipelaying operation, the housing 52 is permitted, by means of the travel of the supports 248 on the monorail 50 to assume a position, by reason of the inclination of the ramp means 28, adjacent the welding work station 42 and abutting the end of a pipeline paid out to that position. Also as subsequently described, the internal clamp is, at that time, inside the pipeline at a position longitudinally spaced from the clamp housing 52. Thus, when the internal clamp is to be retrieved, into the housing 52 it may be desirable to provide a stop means to maintain the housing 52 stationary, in order to prevent the interaction of the retrieved clamp and the housing from causing the housing to be displaced from the internal clamp by travel upwardly on the monorail 50.

One acceptable form of such a stop means is shown in FIG. 11. For simplicity, the structure of the stop means has not been shown in FIGS. 1 and 2. The illustrated stop means 258 may consist of a non-contacting magnetic brake of the type including a core 260 about which a coil 262 is wound. When energized, a magnetic field is generated, which, by reason of the conductive nature of the wheels 256, resists movement of the wheels.

The core 260 may be mounted on the upper truss members 263 adjacent the end of the monorail 50. Suitable electrical connections may be provided to remotely operate the brake 258. After retrieval of the internal clamp into its housing 52, the brake 258 is of course deenergized. It will, of course, be appreciated that when the ramp means 28 is employed in its horizontal position a suitable means may be provided to propel the clamp housing 52.

Pipelaying Procedures

Referring now to FIGS. 12A, 12B, 12C and 12D, a pipelaying procedure according to the present invention will be described.

Initially, the desired angle of penetration of the pipeline into the body of water is established. Afterwards, the ramp means 28 is rotated about the pivot axis 26 to a stationary position wherein the longitudinal direction of extent of the ramp means 28 defines an angle, with respect to a horizontal plane, substantially equal to the desired angle of penetration. In other words, the central axis of the central ramp opening 116 (FIG. 4) defines an angle with the horizontal plane equal to the angle of penetration.

It will be remembered that movement of the ramp means 28 to its selected pivoted position is accomplished by means of the counterweighted guide section 30 which is controlled by the winch 90 and cable 92.

For purposes of discussion it may now be assumed that the generally straight portion of the pipeline 168 is supported by the ramp support means at an angle equal to the selected penetration angle, with the remainder of the pipeline depending into the body of water 22. The manner in which the pipelaying procedure is initiated to accomplish this support will become apparent to one skilled in the art from further discussion. At this point it need only be noted that the fixed clamp means 38 is actuated so as to maintain the pipeline 168 substantially stationary with respect to the ram means 28, and therefore with respect to the barge 20.

Prior to the addition of new pipe sections 80 to the pipeline 168, the manipulating clamps 44 are retracted as indicated by the arrows 264, to the position most remote from the end of the pipeline 168. This end of the pipeline is located above the welding work station 42.

With the loader means 68 in its lower, horizontal position as shown in FIG. 12A, by reason of extension of the cable 100 controlled by the winch 98, a section of pipe 80 is delivered to the loader support means 82 by the conveyor means 78. The loader clamp means 74 are then actuated to maintain the section of pipe stationary with respect to the loader means 68.

It will be noted, that during receipt of the section of pipe 80 on the loader means 68, the internal clamp, schematically indicated at 266 has been retrieved into the clamp housing 52 by means of the winch 66. Moreover, the internal clamp 266 and the housing 52 have been together retracted to their most remote position on the previously identified monorail 50, i.e. the position adjacent the upper end of the ramp means 28.

As shown in FIG. 12B, the loader means 68 is next rotated about the pivot axis 26 to a stationary position wherein the longitudinal direction of extent of the loader means 68 and the supported pipe section 80 define an angle with respect to the horizontal plane substantially equal to the desired angle of penetration. In the preferred embodiment, this is accomplished through operation of the winch 98 which controls the cable 100 to raise the loader means 68 to a position wherein the pipe section 80 is received within the pipe receiving space 48 (FIG. 2) of the ramp means. In this position, the pipe section 80 is generally coplanar with and coaxially aligned with the straight portion of pipeline supported by the ramp means 28. It will also be appreciated that the aligned pipe section 80 is located between the spaced vertical planes through the end 54, internal clamp means housing 52 and the end of the generally straight portion of pipeline supported on the ramp means 28. At the same time, the loader support means for supporting the section of pipe to be added to the pipeline is, as will be apparent, located between the spaced vertical planes bounding the pipe section receiving section 34 which defines the pipe section receiving space 48 of the ramp means.

Through operation of the positioning clamps 44 and disengagement of the loader means clamp 74, the pipe section 80 is transferred to the ramp means 28.

Figure 12C:
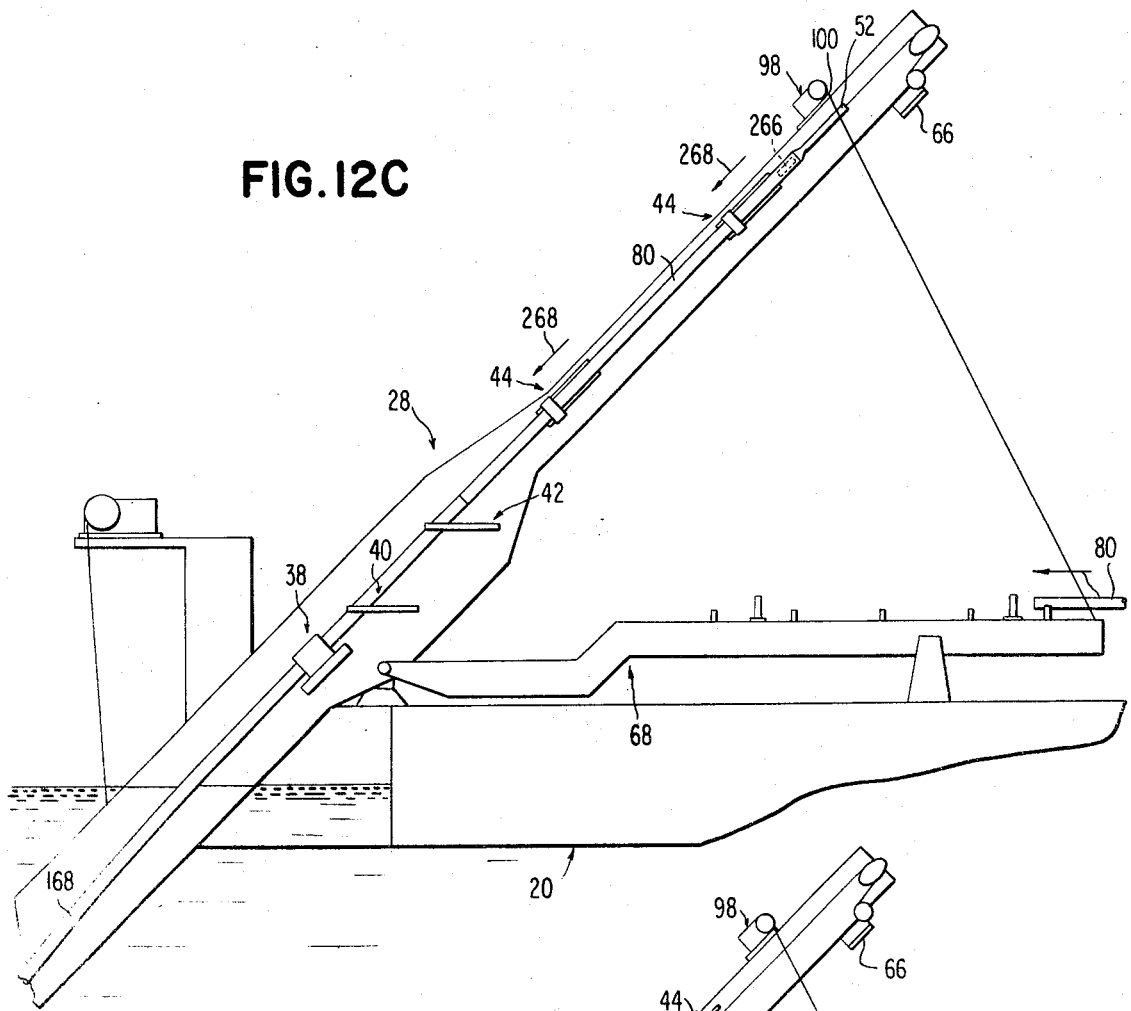
Figure 12D:
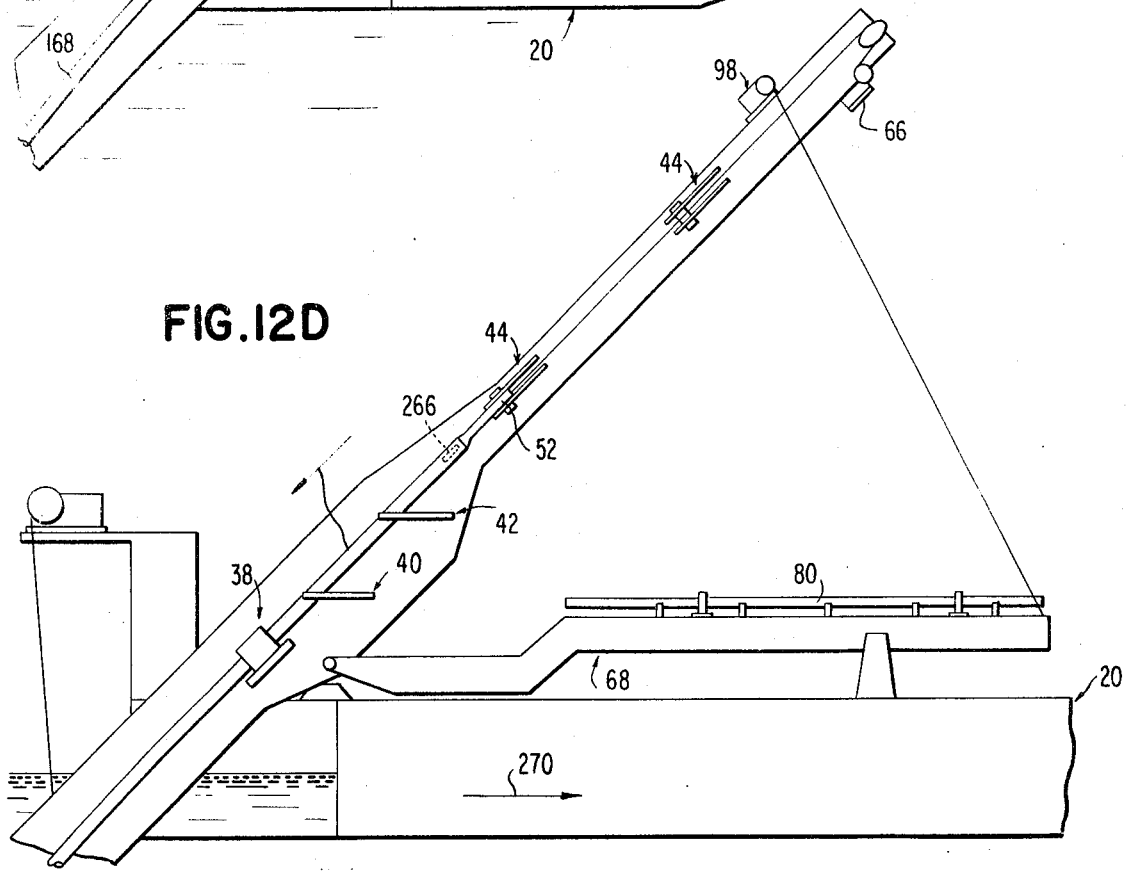

At this point, the loader means 68 may be returned to its generally horizontal position as shown in FIG. 12C.

Again referring to FIG. 12B, the winch 66 is operated to permit the internal clamp means 266 to slide out of its housing 52 and into the new section of pipe 80. It will be appreciated that if the new section of pipe 80, in its position on the ramp means 28 is such that the upper end thereof is longitudinally spaced from the housing 52, the housing 52 by reason of the inclination of the ramp means 28, will be permitted to slide downwardly on the monorail 50 until the bell end 54 thereof abuts the end of the pipe section 80.

In order to facilitate relative movement of the internal clamp means 266 out of its housing 52 and into the pipe section 80, the internal clamp means 266 may be provided with trolley means (not shown). This trolley means may be remotely operable, through the previously described hydraulic umbilical 60, to propel the internal tool in situations wherein the inclination of the ramp means 28 is insufficient for gravity to cause travel of the internal clamp means 266.

Referring now to FIG. 12C, as the loader means 68 is returned to receive a new pipe section 80, the manipulating clamps 44 on the ramp means 28 are operated to move the pipe section 80 gripped thereby into a position wherein the proper welding root gap is established between the pipeline 168 and the pipe section 80. Such movement of the clamps is indicated by the arrows 268. It will be appreciated, that the housing 52 of the internal clamp means 266 is permitted to travel along the monorail 50 in abutting relationship to the upper end of the pipe section 80.

It may be noted that prior to movement of the pipe section 80 by the manipulating clamps 44, the internal clamp means 266 may be actuated. Actuation of the internal clamp means 266 through the hydraulic umbilical 60 is sufficient to cause gripping means carried by the internal clamp 266 to travel radially outwardly of the clamp into fixed engagement with the internal portion of the pipe section 82. Thus, the pipe section 80 and the internal clamp means 266 are maintained fixed with respect to one another. As set forth in the aforementioned Nolan patent application, filed of even date herewith, the internal clamp means 266 may also attach to the pipeline 168 and be utilized for aligning the pipe section 80.

At the position of abutment between the pipe section 80 and the pipeline 168, above the welding station 42, workmen mounted on the platform at this welding station may secure the two members together. Upon completion of the welding operation, the barge 20 may be moved forward, i.e. away from the previously laid portion of the pipeline as indicated by the arrow 270 in FIG. 12D to pay out the pipeline in a first increment so as to place the newly connected joint above the second work station 40. It will be appreciated that during this payout operation, the fixed clamp means 38 on the ramp means 28 is disengaged from the pipeline 168. Moreover, the internal clamp 266 is, as previously mentioned, fixed to the pipe section 80 or the pipeline 168. During payout operation, tension is maintained on the internal clamp means 266, and therefore on the pipeline 168, by means of the winch 66 and its associated cable 58.

At the second work station 40, a coating operation may be performed. Subsequently, the pipeline is paid out the remaining distance so as to place the end thereof above the welding station as shown in FIG. 12A.

During the joining and payout operation, the loader means 68 is provided with an additional section of pipe 80 and the steps outlined in connection with FIGS. 12A-12D may be repeated.

Although not described in detail, it will be apparent to those skilled in the art that suitable control means may be provided for remotely actuating the clamp means 38, 266 and 74 of the ramp means 28 and loader means 68, as well as for remotely controlling the manipulating clamps 44 and the winches 66 and 98. It will also be apparent that means may be provided for remotely controlling the means for maintaining the internal clamp housing 52 in a stationary position during retrieval of the internal clamp 266 into the housing prior to movement of the clamp 266 and the housing to the FIG. 12A position.

SUMMARY OF ADVANTAGES

Thus, it will be seen that by following the present invention an improved pipeline laying system is provided wherein the angle at which the pipeline penetrates the water is controllable through the utilization of a pivotable ramp.

Of particular significance is the provision of the loader means that facilitates a continuous pipeline laying operation and avoids operational difficulties associated with the supply of additional pipe sections to and from the ramp means.

In this connection, the particular movement of the loader means whereby the pipe sections are transferred from the loader means to the ramp means without interfering with the operations at the work stations is particularly advantageous.

A related advantage stems from the use of moveable internal clamp means that avoids exposure of clamping elements that may interfere with the work areas.

Significant additional advantages are provided by the preferred embodiment wherein the loader means is receivable within the ramp means.

Also of importance is the utilization of free-swinging work stations which remain substantially horizontal regardless of the pivotal position of the ramp means. The guide shoe provides the additional advantage of guiding the pipeline in all directions.

Of independent significance is the fact that the ramp means may be utilized in diverse laying operations where great differences in pipeline penetration angle are anticipated. Thus, the ramp means may even be employed in a pipeline laying operation in its horizontal position in connection with a buoyant ramp (not shown) pivotally attached to the barge.

Although the invention has been described with reference to a particular system, it will be apparent to those skilled in the art that additions, modifications, substitutions and deletions may be made in that system without departing from the spirit and scope of the invention as defined in the appended claims.

What is claimed is:

1. Apparatus for laying pipeline from a floating vessel means into a body of water, the apparatus comprising:

elongate, substantially rigid, ramp means including ramp support means for slidably supporting a generally straight portion of the pipeline on said vessel with the remainder of the pipeline depending into the body of water, and including a pipe section receiving means for supporting a new section of pipe to be added to the pipeline, said pipe section receiving means being bounded by spaced vertical planes;

ramp moving means for pivoting said ramp means to selected, stationary pivoted positions;

first clamp means mounted on said ramp means for selectively maintaining said pipeline substantially stationary with respect to said ramp means;

second clamp means mounted on said ramp means, for longitudinal movement along said ramp means for selectively engaging the pipeline so as to be fixed with respect thereto;

means for restraining longitudinal movement of said second clamp means;

elongate, substantially rigid, pipe section loader means including loader support means for supporting a section of pipe to be added to the pipeline;

loader mounting means for pivotally mounting said loader means on said floating vessel means; and loader moving means for pivoting said loader means to selected, stationary pivoted positions with said loader support means and said ramp support means being generally coplaner, and with said loader support means located between the spaced vertical planes bounding said pipe section receiving means.

2. Apparatus for laying pipeline from a floating vessel means into a body of water, the apparatus comprising:

elongate, substantially rigid, ramp means including ramp support means for slidably supporting a generally straight portion of the pipeline on said vessel with the remainder of the pipeline depending into the body of water;

ramp mounting means for pivotally mounting said ramp means on said floating vessel at a position intermediate the ends of said ramp means;

ramp moving means for pivoting said ramp means to selected, stationary pivoted positions;

first clamp means mounted on said ramp means for selectively maintaining said pipeline substantially stationary with respect to said ramp means;

second clamp means mounted on said ramp means, for longitudinal movement along said ramp means for selectively engaging the pipeline so as to be fixed with respect thereto;

means for restraining longitudinal movement of said second clamp means;

elongate, substantially rigid, pipe section loader means including loader support means for supporting a section of pipe to be added to the pipeline;

loader mounting means for pivotally mounting said loader means on said floating vessel means; and, loader moving means for pivoting said loader means to selected, stationary pivoted positions with said loader support means and said ramp support means being generally coplaner, said loader means and said ramp means being mounted for rotation about the same axis, and said ramp means being provided with means for receiving said loader means with said ramp support means and loader support means in longitudinal alignment.

3. Apparatus for laying pipeline from a floating vessel means into a body of water, the apparatus comprising:

elongate, substantially rigid, ramp means including ramp support means for slidably supporting a generally straight portion of the pipeline on said vessel with the remainder of the pipeline depending into the body of water, and including a pipe section receiving means for supporting a new section of pipe to be added to the pipeline, said pipe section receiving means being bounded by spaced vertical planes;

ramp mounting and moving means for rotatably mounting said ramp means for movement about a generally horizontal axis to selected stationary positions between a generally horizontal position and a generally vertical position;

elongate, substantially rigid, pipe section loader means, including loader support means for supporting a section of pipe to be added to the pipeline; and, loader mounting and moving means for rotatably mounting said loader means for movement about a generally horizontal axis, to selected stationary positions wherein said loader support means and said ramp support means are generally coplaner, and with said loader support means located between the spaced vertical planes bounding said pipe section receiving means.

4. Apparatus according to claim 3 including: at least one work station platform; and means mounting said at least one work station platform on said ramp means so as to remain generally horizontal in all positions of said ramp means.

5. Apparatus for laying pipeline from a floating vessel means into a body of water, the apparatus comprising:

elongate, substantially rigid, ramp means including ramp support means for slidably supporting a generally straight portion of the pipeline on said vessel with the remainder of the pipeline depending into the body of water;

ramp mounting and moving means for rotatably mounting said ramp means for movement about a generally horizontal axis to selected stationary positions between a generally horizontal position and a generally vertical position;

elongate, substantially rigid, pipe section loader means, including loader support means for supporting a section of pipe to be added to the pipeline; and, loader mounting and moving means for rotatably mounting said loader means for movement about a generally horizontal axis, to selected stationary positions wherein said loader support means and said ramp support means are generally coplaner, said loader means and said ramp means being mounted for rotation about the same axis; and, said ramp means being provided with means for receiving said loader means with said ramp support means and loader support means in longitudinal alignment.

6. Apparatus for laying pipeline from a floating vessel means into a body of water, the apparatus comprising:

elongate ramp means including longitudinally spaced ramp support means defining a generally straight pipeline support for supporting a generally straight portion of the pipeline on said vessel with the remainder of the pipeline depending into the body of water, and including a pipe section receiving means for supporting a new section of pipe to be added to the pipeline, said pipe section receiving means being bounded by spaced vertical planes;

ramp mounting and moving means for rotatably mounting said ramp means for movement about a generally horizontal axis to selected stationary positions;

first clamp means mounted on said ramp means for selectively maintaining said pipeline substantially stationary with respect to the ramp means;

second clamp means mounted on said ramp means, for longitudinal movement from a position adjacent one end of the ramp means toward and away from the other end of said ramp means, for selectively engaging the pipeline so as to be fixed with respect thereto;

means for controlling longitudinal movement of said second clamp means;

elongate, substantially rigid, pipe section loader means including loader support means for supporting a section of pipe to be added to the pipeline; and loader mounting and moving means for mounting said loader, means on said vessel for movement between a lower pipe section receiving position and selected upper positions with said loader support means and said ramp support means being generally coplanar and with said loader support means located between the spaced vertical planes bounding said pipe section receiving means.

7. Apparatus for laying pipeline from a floating vessel means into a body of water, the apparatus comprising:

elongate ramp means including longitudinally spaced ramp support means defining a generally straight pipeline support for supporting a generally straight portion of the pipeline on said vessel with the remainder of the pipeline depending into the body of water;

ramp mounting and moving means for rotatably mounting said ramp means for movement about a generally horizontal axis to selected stationary positions;

first clamp means mounted on said ramp means for selectively maintaining said pipeline substantially stationary with respect to the ramp means;

second clamp means mounted on said ramp means, for longitudinal movement from a position adjacent one end of the ramp means toward and away from the other end of said ramp means, for selectively engaging the pipeline so as to be fixed with respect thereto;

means for controlling longitudinal movement of said second clamp means;

elongate, substantially rigid, pipe section loader means including loader support means for supporting a section of pipe to be added to the pipeline; and, loader mounting and moving means for mounting said loader means on said vessel for movement between a lower pipe section receiving position and selected upper positions with said loader support means and said ramp support means being generally coplaner, said ramp means including means defining an open loader means receiving area between said one end of said ramp means and said ramp support means; and said loader mounting and moving means including means for positioning said loader support means in said loader means receiving area with the pipe section supported by said loader means generally coaxially aligned with said generally straight portion of pipeline.

8. A method of laying pipeline from a floating vessel into a body of water, the method utilizing a substantially rigid elongate ramp means pivotally mounted on the floating vessel and an elongate substantially rigid pipe section loader means pivotally mounted on the floating vessel, the method comprising:

establishing a desired angle of penetration of the pipeline into the body of water;

rotating the ramp means in an angular direction about a substantially horizontal axis to a fixed angular position wherein the longitudinal direction of extent of the elongate ramp means defines an angle, with respect to a horizontal plane, substantially equal to the desired angle of penetration;

slidably supporting a generally straight portion of pipeline on the ramp means so as to extend in said longitudinal direction with the remainder of the pipeline depending into the body of water;

supporting, in a stationary position, a section of pipe to be added to the pipeline on the pipe section loader means with the pipe section loader means in a substantially horizontal position;

rotating the loader means in said angular direction to a stationary position wherein the longitudinal direction of extend of the loader means and the supported pipe section defines an angle with respect to a horizontal plane substantially equal to the desired angle of penetration to locate the pipe section between the spaced vertical planes through the upper end of the ramp means and the end of the generally straight portion of pipeline supported on the ramp means;

aligning the pipe section in generally coaxial relation with said generally straight portion of pipeline;

connecting the pipe section to said generally straight portion of pipeline;

rotating the loader means in a direction opposite to said angular direction to a substantially horizontal position to receive a further section of pipe to be added to the pipeline by performing said steps of rotating the loader means, aligning the pipe section and connecting the pipe section; and, paying out the pipeline into the body of water by an amount substantially equal to the longitudinal extent of the connected pipe section.

9. A method of laying pipeline from a floating vessel into a body of water, the method utilizing a substantially rigid elongate ramp means pivotally mounted on the floating vessel and an elongate substantially rigid pipe section loader means pivotally mounted on the floating vessel, the method comprising:

establishing a desired angle of penetration of the pipeline into the body of water;

rotating the ramp means in an angular direction about a substantially horizontal axis to a fixed angular position wherein the longitudinal direction of extent of the elongate ramp means defines an angle, with respect to a horizontal plane, substantially equal to the desired angle of penetration;

slidably supporting a generally straight portion of pipeline on the ramp means so as to extend in said longitudinal direction with the remainder of the pipeline depending into the body of water;

supporting, in a stationary position, a section of pipe to be added to the pipeline on the pipe section loader means with the pipe section loader means in a substantially horizontal position;

rotating the loader means in said angular direction to a stationary position wherein the longitudinal direction of extent of the loader means and the supported pipe section defines an angle with respect to a horizontal plane substantially equal to the desired angle of penetration;

aligning the pipe section in generally coaxial relation with said generally straight portion of pipeline;

connecting the pipe section to said generally straight portion of pipeline;

rotating the loader means in a direction opposite to said angular direction to a substantially horizontal position to receive a further section of pipe to be added to the pipeline by performing said steps of rotating the loader means, aligning the pipe section and connecting the pipe section; and, paying out the pipeline into the body of water by an amount substantially equal to the longitudinal extent of the connected pipe section, the step of rotating the loader means in a direction opposite to said angular direction being performed prior to the step of connecting the pipe section to the pipeline; the method further including the step of supporting the pipe section on the ramp means prior to rotating the loader means in a direction opposite to said angular direction.

10. A method according to claim 8, the method utilizing a movable clamp means initially supported by the ramp means adjacent the upper end thereof and a fixed clamp means supported by the ramp means on a lower portion thereof, and wherein:

the step of slidably supporting a generally straight portion of pipeline on the ramp means includes initially maintaining the pipeline substantially stationary with respect to the vessel by releasably engaging the generally straight portion of pipeline with the fixed clamp means;

the step of rotating the loader means in said angular direction includes rotating the loader means to a stationary position supporting the section of pipe to be added to the pipeline in a position wherein one end thereof is adjacent the end of the generally straight portion of pipeline and the other end thereof is located adjacent the movable clamp means;

the step of paying out the pipeline includes the steps of:

engaging the connected pipe section with the movable clamp means so as to maintain the pipeline fixed with respect thereto;

releasing the fixed clamp means from engagement with the pipeline; and, lowering the pipeline depending into the body of water while maintaining tension on the moveable clamp means;

the method further including the steps of:

reengaging the pipeline with the fixed clamp means;

releasing the moveable clamp means from engagement with the connected pipe section; and, retrieving the moveable clamp means to its initial position adjacent the upper end of the ramp means.

11. A method according to claim 8 including the step of:

supporting at least one work station platform on the ramp means in a generally horizontal position and intermediate the ends of the ramp means.

12. A method of laying pipeline from a floating vessel into a body of water, the method utilizing a substantially rigid, elongate ramp means pivotally mounted on the floating vessel and supporting a movable clamp means, a fixed clamp means and an elongate, substantially rigid, pipe section loader means movably mounted on the floating vessel, the method comprising:

establishing a desired angle of penetration of the pipeline into the body of water;

rotating the ramp means in an angular direction about a substantially horizontal axis to a fixed angular position wherein the longitudinal direction of extent of the elongate ramp means defines an angle, with respect to a horizontal plane, substantially equal to the desired angle of penetration;

releasably engaging, with the fixed clamp means, a generally straight portion of pipeline slidably supported on the ramp means so as to extend in said longitudinal direction with the remainder of the pipeline depending into the body of water;

placing a section of pipe to be added to the pipeline on the pipe section loader means located in a lower position thereof;

raising the loader means to a stationary position wherein the longitudinal direction of extent of the loader means and the supported pipe section define an angle with respect to a horizontal plane substantially equal to the desired angle of penetration, and wherein the pipe section is located between the spaced vertical plane through the upper end of the ramp means and the end of the generally straight portion of pipeline supported on the ramp means;

transferring the pipe section to the ramp means by which the pipe section is supported in generally coaxial relation with the generally straight portion of pipeline;

lowering the loader means to a lower position thereof to receive a further pipe section to be added to the pipeline;

during the lowering step, connecting the pipe section to said generally straight portion of pipeline;

engaging at least one of the pipe section and the pipeline with the movable clamp means so as to maintain the pipeline fixed with respect thereto;

releasing the fixed clamp means from engagement with the pipeline; and, paying out the pipeline into the body of water by an amount substantially equal to the longitudinal extent of the connected pipe section while maintaining tension on the movable clamp means;

reengaging the pipeline with the fixed clamp means;

releasing the moveable clamp means from engagement with the connected pipe section;

retrieving the movable clamp means to its initial position;

repeating the step of raising the loader means and transferring the pipe section.

13. A method according to claim 12 wherein the loader means is pivotally mounted for rotation about the same axis as the axis of rotation of the ramp means, the step of raising the loader means comprising:

rotating the loader means in said angular direction to a position wherein the loader means is received by the ramp means.

14. A method according to claim 12 including the step of:
supporting at least one work station platform on the ramp means in a generally horizontal position and intermediate the ends of the ramp means.

15. Apparatus for laying pipeline from a floating vessel means into a body of water, the apparatus comprising:
elongate ramp means including longitudinally spaced ramp support means defining a generally straight pipeline support for supporting a generally straight portion of the pipeline on said vessel with the remainder of the pipeline depending into the body of water;
ramp mounting and moving means for rotatably mounting said ramp means for movement about a generally horizontal axis to selected stationary positions;
first clamp means mounted on said ramp means for selectively maintaining said pipeline substantially stationary with respect to the ramp means;
second clamp means mounted on said ramp means, for longitudinal movement from a position adjacent one end of the ramp means toward and away from the other end of said ramp means, for selectively internally engaging the pipeline so as to be fixed with respect thereto;
means for restraining longitudinal movement of said second clamp means; and,
pipe section loader means for supplying to said ramp means sections of pipe to be added to the pipeline.

16. A method of laying pipeline from a floating vessel into a body of water, the method utilizing a substantially rigid, elongate ramp means pivotally mounted on the floating vessel and supporting a movable internal clamp means and a fixed clamp means, and an elongate substantially rigid, pipe section loader means movably mounted on the floating vessel, the method comprising:
establishing a desired angle of penetration of the pipeline into the body of water;
rotating the ramp means in an angular direction about a substantially horizontal axis to a fixed angular position wherein the longitudinal direction of extent of the elongate ramp means defines an angle, with respect to a horizontal plane, substantially equal to the desired angle of penetration;
releasably engaging, with the fixed clamp means, a generally straight portion of pipeline slidably supported on the ramp means so as to extend in said longitudinal direction with the remainder of the pipeline depending into the body of water;
transferring, using the loader means, a pipe section to the ramp means by which the pipe section is supported in generally coaxial relation with the section of pipeline;
connecting the pipe section to said generally straight portion of pipeline;
internally engaging the pipeline with the movable clamp means to maintain the pipeline fixed with respect thereto;
releasing the fixed clamp means from engagement with the pipeline; and,
paying out the pipeline into the body of water by an amount substantially equal to the longitudinal extent of the connected pipe section while maintaining tension on the movable clamp means;
reengaging the pipeline with the fixed clamp means;
releasing the moveable clamp means from engagement with the pipeline section;
retrieving the moveable clamp means to its initial position;
repeating the step of transferring a pipe section.

17. Apparatus for laying pipeline from a floating vessel means into a body of water, the apparatus comprising:
elongate, substantially rigid, ramp means including ramp support means for slidably supporting a portion of the pipeline on said vessel with the remainder of the pipeline depending into the body of water, and including a pipe section receiving means for supporting a new section of pipe to be added to the pipeline, said pipe section receiving means being bounded by spaced vertical planes;
ramp mounting means for pivotally mounting said ramp means on said floating vessel;
ramp moving means for pivoting said ramp means to selected, stationary pivoted positions;
first clamp means mounted on said ramp means for selectively maintaining said pipeline substantially stationary with respect to said ramp means;
second clamp means mounted on said ramp means, for longitudinal movement along said ramp means for selectively engaging the pipeline so as to be fixed with respect thereto;
means for controlling longitudinal movement of said second clamp means;
elongate substantially rigid, pipe section loader means including loader support means for supporting a section of pipe to be added to the pipeline;
loader mounting and moving means for mounting said loader means on said floating vessel means for movement between a lower pipe section receiving position and selected upper positions wherein said loader support means is located between the spaced vertical planes bounding said pipe section receiving means; and
third clamp means mounted on said loader means for maintaining a pipe section stationary with respect thereto during upward movement thereof.

18. Apparatus for laying pipeline from a floating vessel means into a body of water, the apparatus comprising:
elongate ramp means including longitudinally spaced ramp support means defining a pipeline support for supporting a portion of the pipeline on said vessel with the remainder of the pipeline depending into a body of water, and including a pipe section receiving means for supporting a new section of pipe to be added to the pipeline, said pipe section receiving means being bounded by spaced vertical planes;
ramp mounting and moving means for rotatably mounting said ramp means for movement about a generally horizontal axis to selected stationary positions;
means mounted on said ramp means for controlling payout of said pipeline under tension;

elongate substantially rigid, pipe section loader means including loader support means for supporting a section of pipe to be added to the pipeline; and loader mounting and moving means for mounting said loader means on said vessel for movement between a lower pipe section receiving position and selected upper positions with said loader support means and said ramp support means being generally coplaner, and with said loader support means located between the spaced vertical planes bounding said pipe section receiving means.

19. Apparatus for laying pipeline from a floating vessel means into a body of water, the apparatus comprising:

elongate ramp means including longitudinally spaced ramp support means defining a pipeline support for supporting a portion of the pipeline on said vessel with the remainder of the pipeline depending into the body of water;

ramp mounting means for pivotally mounting said ramp means on said floating vessel at a position intermediate the ends of said ramp means;

ramp moving means for pivoting said ramp means to selected, stationary pivoted positions; and, said elongate ramp means including a terminal guiding section comprised of elongate guide means, mounted on said ramp means at the end portion thereof adjacent the portion of the pipeline supported thereby and surrounding the pipeline by at least about 180°, said elongate guide means defining a predetermined radius of bend at the terminal portion of said elongate ramp means and controlling the radius of bend of the pipeline as it leaves the terminal portion of the ramp means while permitting the pipeling leaving the terminal portion of the ramp means to attain a predetermined radius of bend.

20. A method of laying pipeline from a floating vessel into a body of water, the method utilizing a substantially rigid, elongate ramp means pivotally mounted on the floating vessel and supporting a movable clamp means and a fixed clamp means, and an elongate substantially rigid pipe section loader means movably mounted on the floating vessel and including loader clamp means, the method comprising:

establishing a desired angle of penetration of the pipeline into the body of water;

rotating the ramp means in an angular direction to a fixed angular position wherein the longitudinal direction of extent of the elongate ramp means defines the angle, with respect to a horizontal plane, substantially equal to the desired angle of penetration;

releasably engaging, with the fixed clamp means, a portion of pipeline slidably supported on the ramp means so as to extend in said longitudinal direction with the remainder of the pipeline depending into the body of water;

placing a section of pipe to be added to the pipeline on the pipe section loader means located in a lower position thereof;

clamping the pipe section on the loader means with the loader clamp means so as to maintain the pipe section substantially stationary with respect thereto;

raising the loader means to a stationary position adjacent the ramp means;

transferring the pipe section to the ramp means by which the pipe section is supported in generally aligned relation with the end of the pipeline, the step of transferring including releasing the loader clamp means;

lowering the loader means to a lower position thereof to receive a further pipe section to be added to the pipeline;

connecting the pipe section to said portion of pipeline;

engaging at least one of the pipe section and the pipeline with the movable clamp means so as to maintain the pipeline fixed with respect thereto;

releasing the fixed clamp means from engagement with the pipeline; and, paying out the pipeline into the body of water by an amount substantially equal to the longitudinal extent of the connected pipe section while maintaining tension on the movable clamp means;

reengaging the pipeline with the fixed clamp means;

releasing the movable clamp means from engagement with the connected pipe section; and retrieving the movable clamp means to its initial position.

21. A method of laying pipeline from a floating vessel into a body of water, the method utilizing a substantially rigid elongate ramp means pivotally mounted on the floating vessel and an elongate substantially rigid pipe section loader means movably mounted on the floating vessel, the method comprising:

establishing a desired angle of penetration of the pipeline into the body of water;

rotating the ramp means in an angular direction about a substantially horizontal axis to a fixed angular position wherein the longitudinal direction of extent of the elongate ramp means defines an angle, with respect to a horizontal plane, substantially equal to the desired angle of penetration;

slidably supporting a portion of pipeline on the ramp means, on ramp support means, so as to extend generally in said longitudinal direction with the remainder of the pipeline depending into the body of water;

supporting, in a stationary position, a section of pipe to be added to the pipeline on support means of the pipe section loader means with the pipe section loader means in a lower position;

moving the loader means to a stationary position adjacent the ramp means with the loader support means and the ramp support means being generally coplaner to locate the pipe section between the spaced vertical planes through the upper end of the ramp means and the end of the portion of pipeline supported on the ramp means;

transferring the pipe section to the ramp means;

connecting the pipe section to the pipeline;

returning the loader means to its lower position; and, paying out the pipeline into the body of water by an amount substantially equal to the longitudinal extent of the connected pipe section.

22. A method of laying pipeline from a floating vessel into a body of water, the method utilizing a substantially rigid elongate ramp means pivotally mounted on the floating vessel, the method comprising:

establishing a desired angle of penetration of the pipeline into the body of water;

rotating the ramp means in an angular direction about a substantially horizontal axis to a fixed angular position wherein the longitudinal direction of extent of the elongate ramp means defines an angle, with respect to a horizontal plane, substantially equal to the desired angle of penetration;

slidably supporting a portion of pipeline on the ramp means so as to extend in said longitudinal direction with the remainder of the pipeline depending into the body of water; and, controlling the radius of bend of the pipeline as it leaves the terminal portion of the ramp means while permitting the pipeline leaving the terminal portion of the ramp means to attain a predetermined radius of bend by surrounding the pipeline by at least about 180° with elongate guide shoe means positioned at the terminal portion of the ramp means adjacent the portion of the pipeline supported thereby and defining a predetermined radius of bend at that terminal portion of the ramp means.

23. Apparatus according to claim 1 wherein:
said pipe section receiving means includes means for receiving said loader means with said ramp support means and loader support means in longitudinal alignment.

24. Apparatus according to claim 3 wherein:
said pipe section receiving means includes means for receiving said loader means with said ramp support means and loader support means in longitudinal alignment.

25. Apparatus according to claim 6 wherein:
said pipe section receiving means defines an open loader means receiving zone between said one end of said ramp means and said ramp support means; and said loader mounting and moving means includes means for positioning said loader support means in said loader means receiving zone with the pipe section supported by said loader means generally coaxially aligned with said generally straight portion of pipeline.

26. The method according to claim 8 wherein:
the step of rotating the loader means in said angular direction to a stationary position comprises rotating the loader means to a position received by an open loader means receiving zone between one end of the ramp means and the slidably supported pipeline portion.

* * * * *